United States Patent [19]

Corbin

[11] 4,339,200
[45] Jul. 13, 1982

[54] BORE ILLUMINATING DEVICE

[76] Inventor: Wellington S. Corbin, 439 Eastover Dr., Harrisonburg, Va. 22801

[21] Appl. No.: 175,242

[22] Filed: Aug. 4, 1980

[51] Int. Cl.³ .............................................. G02B 27/00
[52] U.S. Cl. .................. 356/241; 350/96.10; 362/32
[58] Field of Search .................... 356/241; 350/96/10; 362/32

[56] References Cited

U.S. PATENT DOCUMENTS 3,413,067 11/1968 Froio ............................ 350/96.10 X
3,582,638 6/1971 Peters ..................................... 362/32
3,733,138 5/1973 Weinberg ............................. 356/241

FOREIGN PATENT DOCUMENTS 569400 5/1945 United Kingdom ................ 356/241

Primary Examiner—John K. Corbin
Assistant Examiner—Matthew W. Koren
Attorney, Agent, or Firm—Nathaniel A. Humphries

[57] ABSTRACT

A transparent plexiglass light conductor tube has a flashlight connected to one end with a lens and mirror on an opposite end being insertable in a gun bore so that light from the flashlight travels along the rod and is reflected by the mirror to the dispersing lens which radiates the light outwardly to illuminate the surrounding bore area. The transparent light conductor rod has an offset outer end portion to which the flashlight is connected so that the user has a clear view down the bore along the surface of the rod for inspecting the bore as the rod is moved axially along the length of the bore.

5 Claims, 4 Drawing Figures

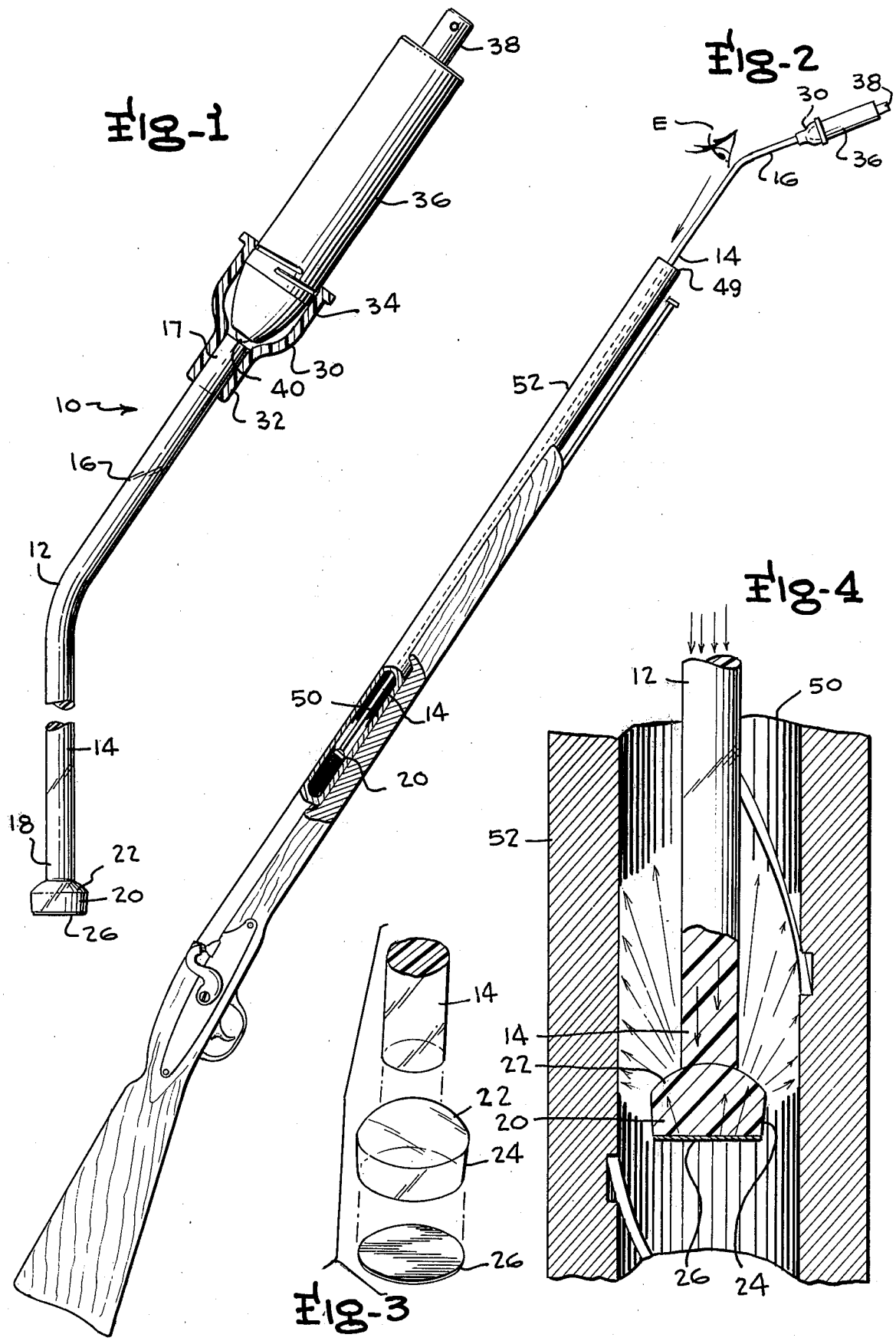

BORE ILLUMINATING DEVICE

BACKGROUND OF THE INVENTION

The present invention is directed to the field of illuminating devices and is more particularly directed to an illuminating device for permitting the inspection of a gun bore or similar recess in any inaccessible area.

A primary concern in determining the condition of a rifled firearm is the condition of the rifling in the bore. While it is possible to visually inspect the rifling of some modern firearms which can be opened at the breach end of the barrel, such inspection is not possible with muzzle-loading firearms. Although various devices have been proposed in the past for permitting bore inspection, such devices have not achieved widespread acceptance due to a number of shortcomings such as functional inefficiency, high cost, difficulty of usage and a high susceptibility to damage inherent in such devices. Prior devices are exemplified by U.S. Pat. Nos. 1,775,452; 2,195,526; 2,428,975; 2,899,856; 2,959,089; 3,221,593; 3,382,408; 3,434,775; 3,582,638; 3,610,763; 3,724,922 and 4,135,824.

Therefore, it is the primary object of this invention to provide a new and improved illumination means for illuminating gun bores or similar areas.

A further object of the invention is the provision of a new and improved gun bore illuminating means which is rugged and economical to fabricate and maintain and which is also easy to use.

SUMMARY OF THE INVENTION

Achievement of the foregoing objects is enabled by the preferred embodiment which comprises an elongated light conductor rod formed of plexiglass and having an inner rod portion and an outer rod portion oriented at an obtuse angle with respect to each other. The inner rod portion has a light dispersing lens at its extreme end with a mirror being affixed to the lens while the outer rod portion has a connector positioning a small flashlight adjacent its end. Light from the small flashlight travels along the length of the light conductor rod and is reflected by the mirror backwardly through the light dispersing lens which disperses it outwardly in a transverse radial direction so as to illuminate the surrounding surface of a gun bore or the like in which the lens and mirror are positioned. The user can look down the gun bore and consequently visually inspect the entire length of the gun bore as the mirror and dispensing lens are moved along the length of the bore. The offset nature of the outer rod portion permits an unimpeded visual inspection of the bore along its entire length.

BRIEF DESCRIPTION OF THE DRAWINGS

FIG. 1 is a side elevation view of the preferred embodiment shown partially in section;

FIG. 2 is a side elevation view of the preferred embodiment as viewed in conjunction with the inspection of the bore of a muzzle-loading rifle;

FIG. 3 is an enlarged exploded perspective view of the end portion of the preferred embodiment which is inserted in the rifle bore; and FIG. 4 is an enlarged sectional view of the rifle bore and the end of the preferred embodiment inserted therein showing the manner of operation of the preferred embodiment.

DESCRIPTION OF THE PREFERRED EMBODIMENT

The preferred embodiment of the invention, generally designated 10, is shown in its entirety in FIG. 1 and includes an elongated transparent light conductor rod 12 formed of plexiglass and comprising an inner linear rod portion 14 and an outer linear rod portion 16 oriented at an obtuse angle with respect to each other. A first end 17 and a second end 18 define the extremities of the elongated light conductor rod 12. End 18 has a light dispersing lens 20 secured to it by a transparent adhesive or by thermal bonding. Light dispersing lens 20 is also formed of plexiglass and has a curved face 22, a side cylindrical surface 24 and a lower face to which a reflecting mirror 26 is attached as best shown in FIG. 4.

First end 17 of the elongated light conductor rod 12 is matingly connected to connector means comprising a flexible rubber or plastic nipple 30 having one end 32 matingly fitting over the first end 17 and having an opposite end 34 matingly fitting over a conventional battery powered flashlight 36. Flashlight 36 includes an axially movable switch actuator 38 which, when moved inwardly, results in illumination of bulb 40 which is positioned adjacent the end 17 of the elongated transparent light conductor rod 12.

In use, the inner end 14 of the preferred embodiment is inserted into the muzzle end 49 of the bore 50 of a rifle barrel 52 as best shown in FIG. 2. Upon actuation of the flashlight 36, the light from bulb 40 enters the end 17 of the transparent elongated light conductor rod 12 and travels along the length of the rod and then downwardly through lens 20 to a plexiglass reflector mirror 26. The light striking mirror 26 is reflected upwardly in a random manner and is directed outwardly by lens 20 in a transverse and radial direction as shown in FIG. 4 so as to illuminate the surrounding areas of the bore 50. Since flashlight 36 is offset with respect to the axis of the bore, it is possible for the user to position his eye E as shown in FIG. 2 to look directly down the gun bore to inspect same as the inner end 18 of the rod is moved along the length of the bore. Thus, the entire length of the bore can be easily and quickly inspected.

Moreover, it should be appreciated that the device is capable of usage by mechanics, plummers, electricians and others having the need for visually inspecting small recessed areas.

Numerous modifications of the preferred embodiment will undoubtedly occur to those of skill in the art. For example, it should be understood that the elongated transparent light conductor rod 12 and the lens can be unitarily formed by a molding or similar process. Additionally, the mirror 26 can also be formed on the lower end of the lens in an integral manner as opposed to the separate mirror secured by adhesive as shown in the preferred embodiment. Thus, the spirit and scope of the invention is to be limited solely by the appended claims.

I claim:

1. An illuminating device for permitting the illumination and inspection of a gun bore or the like having a bore diameter, said illuminating device comprising:

a light source;

a transparent light conductor rod of less diameter than said bore diameter and having first and second ends and dimensioned and shaped to permit insertion of said second end into said bore;

connector means holding said first end of said transparent light conductor rod in facing relation to said light source for receiving light from said light source to be transmitted along the length of said transparent light conductor rod to said second end thereof;

a light reflecting mirror dimensioned to be insertable into said bore and positioned in facing relation to said second end of said transparent light conductor rod to receive and deflect light therefrom; and dispersing lens means for receiving light reflected from said light reflecting mirror and directing such light outwardly to illuminate the adjacent bore surface surrounding said dispersing lens, said dispersing lens being of greater diameter than the diameter of said light conductor rod and having a first face fixed to the second end of said light conductor rod and a second face spaced away from said second end of said light conductor rod with said mirror being positioned on said second face.

2. The illuminating device of claim 1 wherien said transparent light conductor rod includes inner and outer linear rod portions oriented at an obtuse angle with respect to each other with the inner linear rod portion being positionable in said bore and the outer linear rod portion being positioned outwardly thereof in an offset manner.

3. The illuminating device of claim 2 wherein said light conductor rod is formed of plexiglass.

4. The illuminating device of claim 1 wherein said transparent light conductor rod includes inner and outer linear rod portions oriented at an obtuse angle with respect to each other with the inner linear rod portion being positionable in said bore and the outer linear rod portion being positioned outwardly thereof in an offset manner and wherein said light source comprises a battery powered flashlight.

5. The illuminating device of claim 4 wherein said connector means comprises nipple means having a first end matingly fitting over the first end of said transparent light conductor rod and a second end matingly fitting over said battery powered flashlight.

* * * * *